US008706602B2

(12) United States Patent
Gilpin

(10) Patent No.: US 8,706,602 B2
(45) Date of Patent: *Apr. 22, 2014

(54) FINANCE AND CONFIGURATION METHOD AND APPARATUS

(71) Applicant: Versata Development Group, Inc., Austin, TX (US)

(72) Inventor: Kevin Gilpin, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,482

(22) Filed: Jun. 9, 2013

(65) Prior Publication Data

US 2013/0346271 A1 Dec. 26, 2013

Related U.S. Application Data

(62) Division of application No. 09/969,227, filed on Oct. 2, 2001, now Pat. No. 8,463,682.

(60) Provisional application No. 60/237,412, filed on Oct. 2, 2000.

(51) Int. Cl.
*G06Q 40/00* (2012.01)

(52) U.S. Cl.
USPC .......... 705/36; 705/4; 705/7.13; 705/35; 705/36 R; 705/38; 706/46; 706/47; 719/317

(58) Field of Classification Search
USPC .......... 705/4, 7.13, 35, 36, 36 R, 38; 706/46, 706/47; 719/317
See application file for complete search history.

(56) References Cited

U.S. PATENT DOCUMENTS

| 4,736,294 | A | * | 4/1988 | Gill et al. | 705/38 |
|---|---|---|---|---|---|
| 5,603,031 | A | * | 2/1997 | White et al. | 719/317 |
| 5,774,883 | A | * | 6/1998 | Andersen et al. | 705/38 |
| 5,809,212 | A | * | 9/1998 | Shasha | 706/46 |
| 5,966,693 | A | * | 10/1999 | Burgess | 705/4 |
| 6,067,525 | A | * | 5/2000 | Johnson et al. | 705/7.13 |
| 6,272,528 | B1 | * | 8/2001 | Cullen et al. | 705/36 R |
| 6,324,523 | B1 | * | 11/2001 | Killeen et al. | 705/36 R |
| 6,430,542 | B1 | * | 8/2002 | Moran | 705/36 R |
| 6,598,028 | B1 | * | 7/2003 | Sullivan et al. | 705/36 R |
| 7,212,996 | B1 | * | 5/2007 | Carnahan et al. | 705/36 R |
| 2002/0007332 | A1 | * | 1/2002 | Johnson et al. | 705/36 |

(Continued)

OTHER PUBLICATIONS

Non-Final Office dated Jun. 5, 2006 mailed in parent U.S. Appl. No. 09/969,227, 6 pages.

(Continued)

*Primary Examiner* — Muhammad Shafi
*Assistant Examiner* — Sanjeev Malhotra
(74) *Attorney, Agent, or Firm* — Terrile, Cannatti, Chambers & Holland, LLP; Kent B. Chambers

(57) ABSTRACT

A method and apparatus for automatically evaluating financing plans are presented. In one embodiment, a method for automatically evaluating financing plans comprises receiving an input message comprising base data; selecting one of a plurality of financing plans in accordance with the base data and data defining the plurality of financing plans; determining values of one or more terms associated with the selected financing plan; and generating an output message including the determined values of the one or more terms.

18 Claims, 4 Drawing Sheets

(56) References Cited

U.S. PATENT DOCUMENTS

| | | | |
|---|---|---|---|
| 2002/0065753 A1* | 5/2002 | Schloss et al. | 705/35 |
| 2002/0073005 A1* | 6/2002 | Welnicki et al. | 705/35 |
| 2002/0091608 A1* | 7/2002 | Odegaard et al. | 705/36 |
| 2002/0198856 A1* | 12/2002 | Feldman et al. | 706/47 |
| 2007/0156554 A1* | 7/2007 | Nikoley et al. | 705/35 |

OTHER PUBLICATIONS

Response to Non-Final Office dated Jun. 5, 2006 as filed in parent U.S. Appl. No. 09/969,227 on Dec. 5, 2006, 12 pages.
Final Office dated Feb. 23, 2007 mailed in parent U.S. Appl. No. 09/969,227, 6 pages.
Request for Continued Examination ("RCE") filed with RCE Submission in parent U.S. Appl. No. 09/969,227 on Jul. 23, 2007, 16 pages.
Non-Final Office dated Dec. 13, 2007 mailed in parent U.S. Appl. No. 09/969,227, 14 pages.
Response to Non-Final Office dated Dec. 13, 2007 as filed in parent U.S. Appl. No. 09/969,227 on Jun. 13, 2008, 14 pages.
Final Office dated Aug. 22, 2008 mailed in parent U.S. Appl. No. 09/969,227, 19 pages.
Request for Continued Examination ("RCE") filed with RCE Submission in parent U.S. Appl. No. 09/969,227 on Feb. 23, 2009, 20 pages.
Non-Final Office dated Apr. 16, 2009 mailed in parent U.S. Appl. No. 09/969,227, 29 pages.
Response to Non-Final Office dated Apr. 16, 2009 as filed in parent U.S. Appl. No. 09/969,227 on Oct. 16, 2009, 18 pages.
Final Office dated Feb. 3, 2010 mailed in parent U.S. Appl. No. 09/969,227, 29 pages.
Request for Continued Examination ("RCE") filed with RCE Submission in parent U.S. Appl. No. 09/969,227 on Aug. 3, 2010, 17 pages.
Non-Final Office dated Sep. 24, 2010 mailed in parent U.S. Appl. No. 09/969,227, 31 pages.
Response to Non-Final Office dated Sep. 24, 2010 as filed in parent U.S. Appl. No. 09/969,227 on Mar. 24, 2011, 17 pages.
Final Office dated Jun. 9, 2011 mailed in parent U.S. Appl. No. 09/969,227, 37 pages.
Request for Continued Examination ("RCE") filed with RCE Submission in parent U.S. Appl. No. 09/969,227 on Dec. 9, 2011, 22 pages.
Non-Final Office dated Jul. 17, 2012 mailed in parent U.S. Appl. No. 09/969,227, 37 pages.
Response to Non-Final Office dated Jul. 17, 2012 as filed in parent U.S. Appl. No. 09/969,227 on Nov. 19, 2012, 8 pages.
Notice of Allowance dated Jul. 17, 2012 mailed in parent U.S. Appl. No. 09/969,227, 13 pages.

* cited by examiner

FINANCE AND CONFIGURATION METHOD AND APPARATUS

CROSS-REFERENCE TO RELATED APPLICATION

This application is a divisional of application Ser. No. 09/969,227, filed Oct. 2, 2001, now U.S. Pat. No. 8,463,682, which claims the benefit of priority from Provisional Patent Application No. 60/237,412, filed Oct. 2, 2000, and entitled "Finance and Configuration Method and Apparatus," having Kevin Gilpin as the inventor. Both of these applications are incorporated herein by reference in their entireties.

RESERVATION OF COPYRIGHT

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the automated determination of terms for purchases, including product options and configurations, financing terms and the like, and more particularly to flexibly determining any one subset of purchase terms based on a user specifying a requisite subset of other purchase terms.

2. Background of the Related Art

Computer networking has significantly altered the global marketplace for many goods and services. For example, consumers can access the Internet to shop on-line for goods and services without having to leave their own home. Large companies having affiliates throughout the world are often interconnected via high-speed intranet computer networks in an effort to provide goods and services of consistent quality to consumers in many different locations throughout the world.

One worldwide market that has seen explosive growth on the Internet is that of automobile sales and the administration of credit and lease plans to support the financing of purchases thereof. Numerous web sites have sprung up that are intended to facilitate the consumer's evaluation of the many makes and models of vehicles offered by manufacturers. These web sites typically provide pricing information (both base price and available options), as well as specifications and performance evaluations. Often, a web site will provide a simple application program that calculates an approximate monthly payment based on user inputs such as the price of the vehicle, down payment, duration of loan or lease, and interest rate to obtain an approximate monthly payment. Sometimes, the program can also calculate a purchase price based on a desired monthly input and duration. The results provided by such an application do not typically reflect the terms and constraints of specific programs offered by financial institutions, and thus can provide only a guideline.

The web site may also provide a link to a web site sponsored by a financial institution that is in the business of financing the lease or purchase of vehicles. Such a web site will likely provide information concerning the institution, its various financing plans and perhaps an on-line application that a consumer can fill out to electronically apply for credit with the institution. This type of web site may also include an application program that can calculate monthly payments or a permissible purchase price based on purchase terms supplied by the user. If a dealer or manufacturer sponsors a web site, the web site may also provide specific information regarding financing options available to purchasers through the dealer or manufacturer.

The loan calculator programs heretofore available on such web sites are limited in that they require the user to input virtually all of the terms, including the duration of the financing program, the interest rate and the type of financing plan chosen by the user. Thus, the results provided by the program are based on assumptions made by the user concerning the programs that are or may be available from the institutions providing the financing plans. The best that these applications can provide is still an approximation for guideline purposes only.

Often, institutions providing financing plans have many different types of plans available, each of which can vary depending upon certain contextual information and constraints. For example, some plans may be for the financing of vehicle purchases, while others are for leasing the vehicle. Typically, the interest rates for each type of plan will vary as a function of many factors. Some of these factors include the duration of the plan, the amount of any down payment made by the purchaser, the age of the purchaser, the type of vehicle, the nature of the purchaser (e.g. corporate or individual), and even the state or country in which the purchase is made. Some plans will be available only under certain conditions and not others. Global institutions may have many plans available in one state or country not available in another state or country. The more global the institution, the more difficult a task it is for the institution to maintain all of the available plans and their variations.

SUMMARY OF THE INVENTION

In one embodiment of the present invention, a method and apparatus for automatically evaluating financing plans are presented. In one embodiment, a method for automatically evaluating financing plans comprises receiving an input message comprising base data; selecting one of a plurality of financing plans in accordance with the base data and data defining the plurality of financing plans; determining values of one or more terms associated with the selected financing plan; and generating an output message including the determined values of the one or more terms.

DETAILED DESCRIPTION

The following is a detailed description of the preferred embodiments of the present invention.

It is desirable to provide a financing application program that is cognizant of many financing plans and variations thereof that are available from a financing institution and product provider, including all constraints and context information. Additionally, the program may be cognizant of services and service plans (such as extended warranty plans) that may be available from a product provider. Such a program would provide an accurate determination of information such as the monthly payment for the purchase of a certain product under a certain financing and service plan, and permit a consumer or the institution to determine which of the plans is the best for the consumer. The program would permit the addition of new plans and plan variations without disrupting the existing plans. Moreover, the program would permit the starting point of the plan evaluation to be completely flexible, so that the user could start, for example, with a monthly payment and see all available plans and the total purchase price that could be made, or start from a total purchase price of selected product and determine monthly payment as a function of down payments or plan duration. Finally, the program would be compatible with a product configurator that can configure various product options based on the purchase price determined by the financing application or suggest certain vehicles as a function of features and options prioritized as a function of importance by the buyer. The products may be any product or service, such as vehicles, computers, furniture, insurance plans and services, etc.

A method and apparatus for financing and configuring purchases of automobiles is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
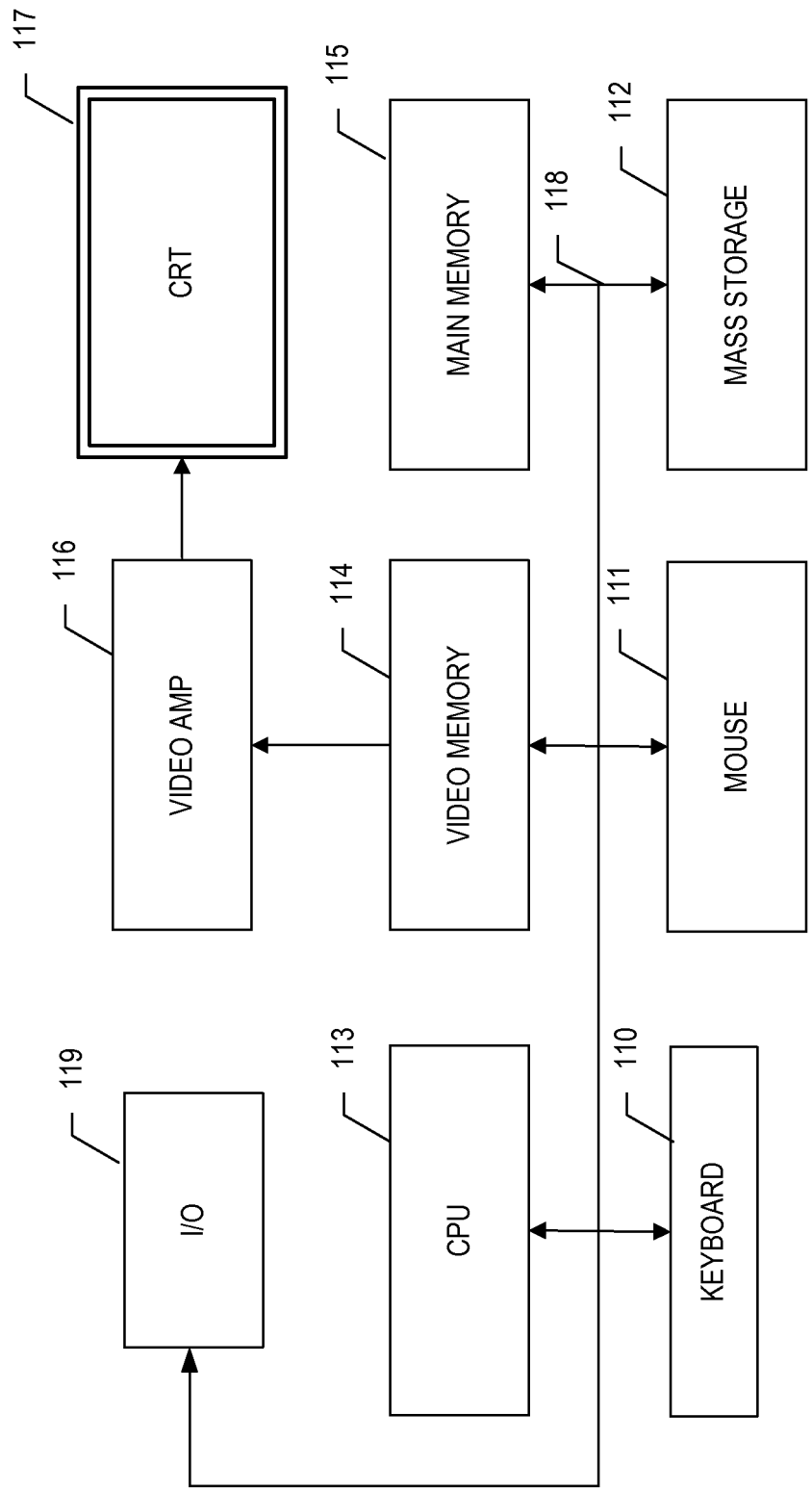
FIG. 1 illustrates a general-purpose computer upon within which the invention may be implemented.

The present invention can be implemented on a general-purpose computer such as illustrated in FIG. 1. A keyboard 110 and mouse 111 are coupled to a bi-directional system bus 118. The keyboard and mouse are for introducing user input to the computer system and communicating that user input to processor 113. The computer system of FIG. 1 also includes a video memory 114, main memory 115 and mass storage 112, all coupled to bi-directional system bus 118 along with keyboard 110, mouse 111 and processor 113. The mass storage 112 may include both fixed and removable media, such as other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

Computer programs and data are generally stored as instructions and data in mass storage 112 until loaded into main memory 115 for execution. Computer programs may also be in the form of electronic signals modulated in accordance with the computer program and data communication technology when transferred via a network.

In the preferred embodiment of this invention, the processor 113 is a 32-bit microprocessor manufactured by Motorola, such as the 680X0 processor or microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic Images.

The computer system described above is for purposes of example only. The present invention may be implemented in any type of computer system or programming or processing environment. It is contemplated that the present invention might be run on a stand-alone computer system, such as the one described above. The present invention might also be run from a server system that can be accessed by a plurality of client computer systems interconnected over an intranet network, such as one interconnecting several locations of a dealership or a financial institution. Finally, the present invention may be run from a server that is accessible to clients over the Internet.

The preferred embodiment of the present invention includes an object model and an engine to operate on the model. The model serves as a hierarchical representation of one or more, and preferably all, of the financing plans administered by a financing institution, which may be a bank, a manufacturer or dealer financing department, or any other entity that finances a product under consideration. The model embodies all of the data necessary for the engine to operate. The model is preferably built with XML files that are imported into a backbone database. The backbone provides a comprehensive platform for XML based enterprise data and applications. Once the model is stored in the database, any configuration information (discussed in more detail below) is compiled so that the engine understands it. A user interface to the model is then built using well-known techniques such as Java® Servlets, or other user-interface paradigm. The user interface is the means by which a user is prompted for information and the user inputs information into the application to supplement data that is already represented by the model.

The discussion uses a specific product, i.e. a vehicle, as a specific example of a product. However, it will be recognized by those of ordinary skill in the art that the description is valid for any other product.

The object model serves two primary functions. First, it represents plan availability based on the configuration of financing information. Second, it provides the engine with all of the information necessary for the engine to identify and evaluate the terms of the appropriate plan or plans. This enables the engine to return terms such as monthly payment, total amount financed, retained commissions, residual value of vehicle, etc., depending upon the initial information provided by the user and the model. The model stores information such as an inventory of finance plans offered, categories of such plans (e.g. loans and leases), contextual information (e.g. permissible ages of cars, geographical location of purchase), plan parameters, and algorithms for evaluating terms of each plan.

Each category of plan or individual plan may contain its own set of plan parameters. These parameters are typically one of three types: external to the plan (e.g. amount to be financed, duration, down payment, etc.), fixed for a given plan, or flexible (i.e. they are calculated from other parameters). Algorithms are a series of mathematical operations that compute one or more results. Algorithms are represented as objects within the model to keep the system independent of the implementation details of the algorithms.

The plan data is preferably organized into different types of trees, each sharing the common attributes that each tree is identified by with a name, each node of a tree has one parent (except for the root of the tree, which has none) and zero or more children. Parameter values may be defined on each node, used by the algorithms to perform the computations initiated by the user requests. The most basic type of tree is the Hierarchy tree, used to represent plan-specific information such as the permissible duration of the plans, permissible down-payment percentages, contextual information, etc. A second type of tree is the PlanHierarchy tree. Plans are organized into PlanHierarchy elements. PlanHierarchy extends the hierarchy element to allow the definition of algorithms. The third type of tree is the ComboHierarchy. A ComboHierarchy is a tree that is composed of two or more parent Hierarchies or PlanHierarchies. The ComboHierarchy tree type is used to define parameter values that depend on more than one hierarchy node. For example, the interest rate of a leasing plan may depend on the down payment amount and on the duration. Since the down payment and duration are likely to be modeled in two distinct hierarchies, a Combo Hierarchy is created in order to define the interest rates. A ComboHierarchy node is considered by the engine to be selected when all of its parent nodes are also selected.

Configuration information dictates to the engine certain rules regarding the selection and availability of nodes for selection as it operates on the model. Configuration information includes constraints on the availability for selection of certain nodes under certain conditions in hierarchies of the model. For example, the engine may not select a certain node if certain others have already been selected. Constraints are created based on rules representing relationships between plans represented in the model and certain external and contextual information. Thus, constraints are used to represent a particular leasing plan that may not be available to an individual, but only to a corporate or other business entity, or may be available in one country but not others. Configuration information also may include expressions concerning the minimum and maximum number of data selections that the engine will permit from a tree. Configuration information may include priority of certain nodes over others if the engine, in one embodiment, is required to act on the model (i.e. completion behavior has been enabled) without a complete set of user selections. Finally, configuration information may include Boolean range expressions that permit the engine to match a numerical input value to a particular node.

The engine of the preferred embodiment performs two separate functions. First, the engine evaluates constraints and determines compatibility of plans and contexts. This is a configuration problem. For more background information concerning an example of the configuration problem, consult U.S. Pat. No. 5,825,651 entitled, "Method and Apparatus for Maintaining and Configuring Systems," issued Oct. 20, 1998, which is incorporated herein in its entirety by this reference. The second function performed by the engine is to evaluate algorithms and compute plan terms based on the requests input by the user.

The preferred embodiment of the present invention employs the configuration engine disclosed in the above-incorporated patent. When a model of the present invention is compiled, the hierarchies and constraints in the model are converted by the compiler into a fast, efficient, run-time format that can be loaded by the configuration and finance engines (collectively known as the "engine.") The engine evaluates an algorithm in several stages. First, the application selects various nodes and sets parameter values based on user input. In the preferred embodiment, the engine may also select nodes if required by "includes" rules or if completion behavior is enabled. Based on the user information, the application then requests that a named AlgorithmDescriptor be executed. The engine looks for an algorithm that matches the AlgorithmDescriptor, and which can be run by the currently selected plan. If no matching AlgorithmDescriptor is found, an error is flagged. Third, the engine gathers together all the selected nodes and finds all the parameter values in the database that match those nodes. Finally, the algorithm is evaluated with the parameter values and the results are returned to the application.

By application of the following simple example, a model of the present invention is constructed for the example, and execution of the example model by the invention is also demonstrated.

The three finance plans represented in the finance model are defined in Table 1 below:

TABLE 1

| Interest Rate | Interest Rate | Down-payment Amount | Customer Type | Allowed Duration | Priority |
|---|---|---|---|---|---|
| Lo Plan | 7.95% | At Least 10% of Amount Financed | Private Individual | 12 or 24 months | 1 |
| High Plan | 9.95%-12.95%, depending on the down-payment | Any amount | Private Individual | 12, 24, 36, 48, or 60 months | 3 |
| Corporate Plan | 6.95%-9.95%, depending on the down-payment | Any amount | Corporate | 12, 24, 36, 48, or 60 months | 2 |

The model for these three plans is built in accordance with the following steps:

Step 1: Defining the Plans

The first step in modeling is to define the plans that are available. To keep the model simple, the three plans as described in the table are created. The Lo Plan is the least expensive, but it is only available for 12 or 24 month terms and requires a down-payment of at least 10%. The Hi Plan is more expensive, but it is available for any duration. The Corporate Plan provides somewhat better rates than Hi Plan, but it is only available to corporate customers.

Because exactly one plan is preferably selected, the min and max values for the plan hierarchy should be min/max=1/1. Also, to force the engine to have a preference for the Hi Plan, the Hi Plan is given the highest priority. Note that the PlanHierarchy has two levels of nodes, and two classifiers have been declared to represent it in the XML file, which is found on page 1 of Appendix A attached hereto.

Step 2: Adding the Contextual Hierarchies and Constraints

The terms and availability of the leasing plans will be dependent on several factors. These factors will be modeled using additional hierarchies separate from the PlanHierarchies. These hierarchies include Lease Duration, which is the amount of time that the lease can be in effect. The permissible values are 12, 24, 36, 48, and 60 months. This hierarchy also has a min/max=1/1, and the selection 48 Months is given the highest priority to establish a preference. Customer Type is a second such hierarchy, which determines whether the customer is a corporate or private customer. A third such hierarchy defines Down Payment as the amount that the client application will supply as a percentage of the total purchase amount. The percentage is matched to a node using the Boolean Range expressions defined in the table above.

The XML file corresponding to this step is on pages 2-3 of Appendix A.

Step 3: Defining the Financing Algorithm

The step in the modeling process is to define the mathematical algorithms that compute the financing terms. The preferred embodiment provides several different ways to define these algorithms, but typical components are an AlgorithmDescriptor, an Algorithm and an AlgorithmStage. The AlgorithmDescriptor defines the input and output parameters of the algorithm. The purpose of the AlgorithmDescriptor is to allow a client to determine which Algorithm to run to get the desired result. AlgorithmDescriptors define the interface to an algorithm in terms of its inputs and outputs. They provide a layer of abstraction between the user and the implementation details of an Algorithm, and allow Algorithms to be evaluated polymorphically by the calculation engine. Each algorithm is defined on a PlanHierarchy node. Any finance plan that is a child of this plan, as well as the plan itself, can be evaluated with this Algorithm. The Algorithm themselves are composed of stages. A stage can be implemented with a free-text formula that is interpreted by the engine of the preferred embodiment, or as a Java method that conforms to an appropriate interface. An AlgorithmStage can also be implemented by another Algorithm (as in a procedure 10 call).

Any number of algorithms can be defined and implemented in the model of the preferred embodiment as necessary to provide the results desired by the user running the client application. For example, one algorithm might compute the monthly payment from the total amount financed and the down payment. Another algorithm might compute the maximum amount that can be financed based on a given monthly payment and down payment percentage. An additional advantage of the present invention is that a particular AlgorithmDescriptor may call different Algorithms for different finance plans, depending upon what selections the user has made.

The sample model of the example has two algorithms. The first simply computes the total amount to be financed from the purchase price of the car and the down payment amount. In a more complex model, other factors such as optional services can also be included in the total amount to be financed. The second, and more complex algorithm, computes the monthly payment. Its input parameters are "The price of the vehicle being financed," "the down-payment," "the duration of the financing," and "the interest rate." The interest rate parameter may not be supplied by the user. The value of this parameter is supplied by the parameter values in the model based on the user's selections.

The second algorithm has one output, "the monthly payment on the lease." In a more complex model, the "monthly payment" might also depend on such factors as the residual value of the vehicle. The definitions of the parameters, the various parts of the algorithms, and the formulae are readily discerned from the XML file for this step on pages 4-6 of Appendix A.

Step 4: Adding Constraints

It was previously noted in Step 1 that the Corporate Plan is only available to corporate customers, that the Hi Plan is only available for 12 or 24 months, and requires a minimum down payment of 10%. These constraints are preferably represented somewhere in the model. The preferred embodiment contemplates four types of constraints. A first, called "Includes," requires that the node(s) on the right-hand side (RHS) of the constraint are included when the left-hand side (LHS) node(s) are selected. A second, called "RequiresChoice," requires that when the node(s) on the LHS of the constraint are selected, between Min and Max of the node(s) on the RHS will also be selected. Note that a RequiresChoice with min/max=1/1 and one node on its RHS has exactly the same effect as an Includes constraint. A third, called "CantWorkWith" (or "Excludes") requires that the node(s) on the RHS of the constraint are Excluded when the LHS node(s) are selected. The fourth, called "Removes," requires that when the node(s) on the LHS of the constraint are selected, if the node(s) on the RHS are Included they are made Excluded.

Since the Lo Plan is only available for 12 or 24 months, and only with a down payment of at least 10%, the model of the example includes RequiresChoice and Includes constraints that enforce these conditions. And since the Corporate Plan is only available to corporate customers, it has a constraint that Includes the Corporate Customer node. Excluding the Private Customer node would have the same effect, because only one node may ever be selected from the Customer Type hierarchy (min/max=1/1). The XML file for this step of the example is found on pages 7-9 25 of Appendix A.

Step 5: Defining Parameter Values

The example model now has plans, hierarchies, constraints, and algorithms.

Notice that in one embodiment the monthly payment algorithm requires a parameter called P_InterestRate. The comment in the model where this parameter is defined states that P_InterestRate is defined in the model, but we have not done so yet. If the engine were run against the model from Step 3, it would complain that P_InterestRate is undefined. Lo Plan has a fixed interest rate, so we can simply attach the interest rate parameter value to the node itself. To make this example more interesting, and to demonstrate the usage of the ComboHierarchy, the interest rates for Hi Plan and Corporate Plan depend on the down payment. The ComboHierarchy H_InterestRates contains the values of this parameter for each plan/down payment combination. The XML file corresponding to this step is found on pages 10-13 of the Appendix A.

Step 6: Defining Groupings

Using two levels of hierarchy to define the Down Payment Amount works fine in this case. But suppose that the finance plans depended on more complex ranges of down payment. For example, the interest rate for one plan might be defined for down payments of 0-10%, 10-20%, and 20-30%. Another plan's interest rates might be defined for down payments of 0-5%, 5-15%, and 15-25%. In this case, it is not possible to represent all the down payment ranges with a two-level hierarchy.

To solve this problem, SC Finance includes the concept of Groupings. A grouping is a hierarchy node that represents a grouping of other nodes in the same hierarchy. For the example above, the down payment hierarchy could be defined with values of 0-5%, 5-10%, 10-15%, 15-20%, 20-25%, and 25-30%. Then, groupings can be defined for the range values that actually apply to the plans.

We can demonstrate the use of groupings by restructuring the Down payment hierarchy in example model. The two levels of down payment hierarchy have been reduced to one by defining the nodes Less Than 10%, 10%-20%, and At Least 10% as groupings. The combo hierarchy that defines the interest rates has also been modified to use these groupings rather than the two-level hierarchy. Such groupings in more complex examples prevent an explosion of data that must typically be entered and maintained. The XML file that corresponds to this step on pages 14-18 of Appendix A.

Step 7: Sorting

So far our model enables us to compute the monthly payment for any valid combination of finance plan, duration, down payment, and customer type. But to really help a customer choose a plan, it is very valuable to answer questions like: "I know how much I want to pay per month, so what is the best plan duration for me?" Or, "I know how much I want to pay and that I want the Lo Plan lease, so which vehicles can I afford to buy?"

To provide answers to these questions, the preferred embodiment includes a powerful feature: the ability to sort nodes by running an algorithm for each one and comparing the results. This simple model demonstrates how to enable the sorting feature. The primary change is the addition of a new algorithm called A_ClosestPayment. This algorithm first runs the A_MonthlyPayment algorithm to determine the monthly payment. Then it computes the absolute value of the difference between an input parameter (P_InputPayment), and the computed P_PureFinanceMonthlyPayment. In effect, the algorithm computes a distance measure between what the user wants to pay and what the plan will cost. The arguments to the sorting method are: a group or array of parts to be sorted, the name of the algorithm descriptor to use, the name of the parameter to be used to sort the parts, and an array of Results that will be populated with the results of running the algorithm for each part (optional). Ultimately, the Parts are sorted by the result parameter from lowest to highest. The XML file invoking the sort method is found on pages 19-23 of the Appendix A.

Figure 2A:
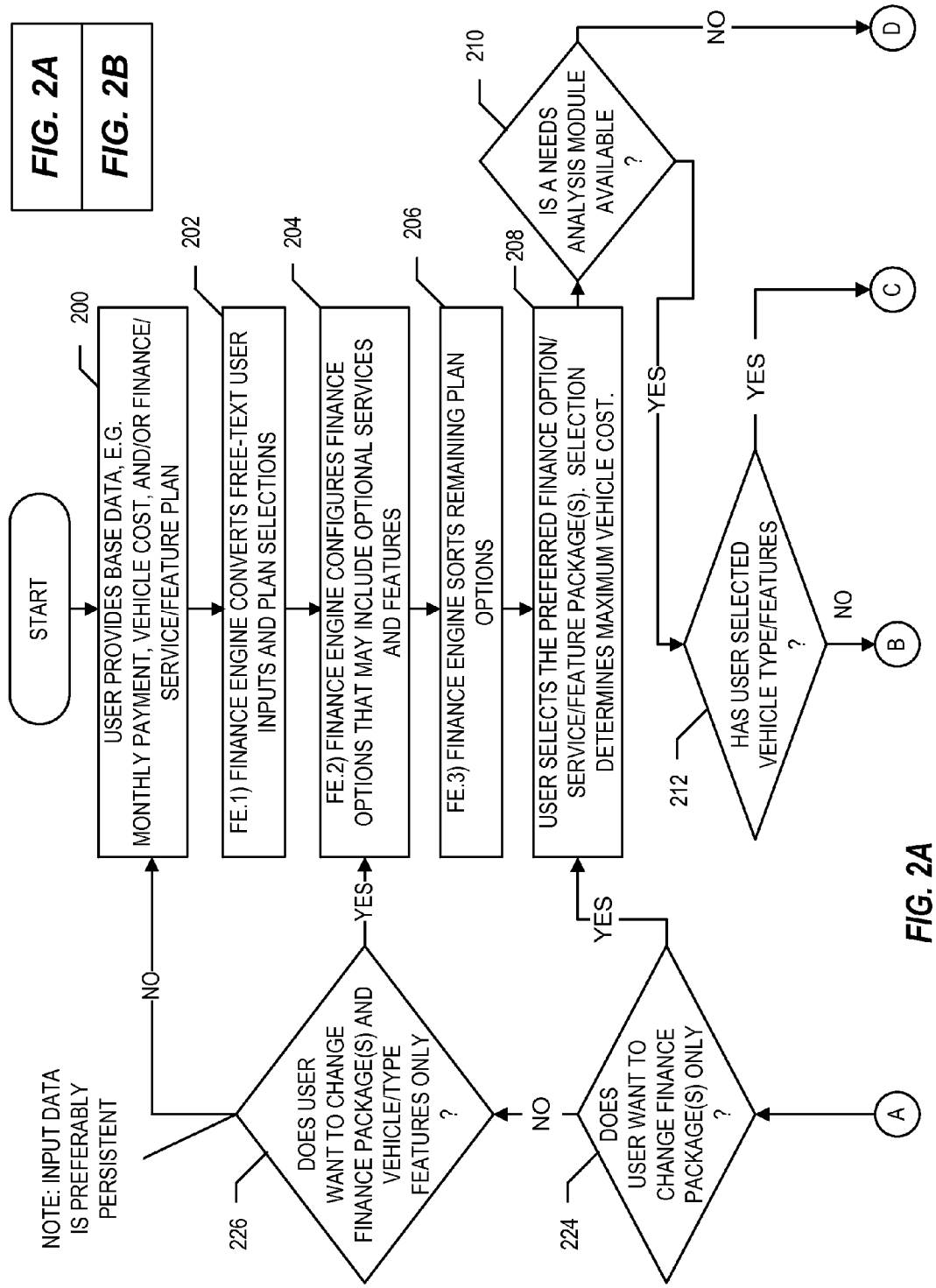
FIGS. 2A and 2B (collectively referred to herein as FIG. 2) collectively represent a procedural flow diagram illustrating the finance-to-configure embodiment of the present invention.
Figure 2B:
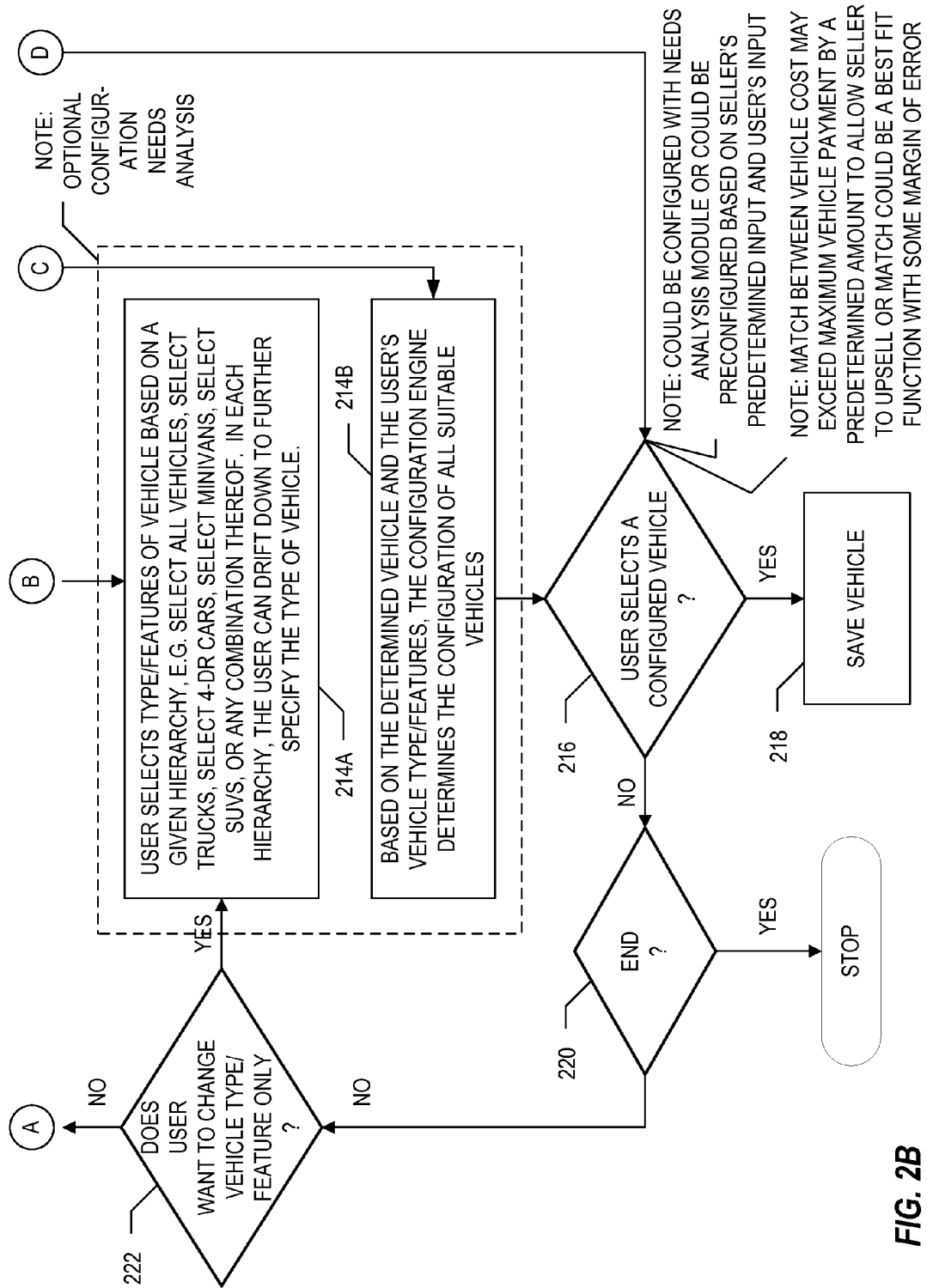

The following description of the engine operating on the example model is made in conjunction with the procedural flow diagram of FIG. 2. The engine of the present invention has two ways of calculating parameter values. The first is looking up their values from the model, and the second is by evaluating Algorithms that compute them. For the example model, the 'P_Duration' and 'P_Interest Rate' parameters are defined in the model. Each Duration node has a value for the P_Duration parameter: '12' for '12 months', '24' for '24 months', etc. The values of P_InterestRate are defined in a more complex way. The 'Lo Plan' always has a fixed value of P_InterestRate=7.95%. But for the 'Hi Plan' and 'Corporate Plan', however, the interest rate depends both on which plan is selected, and on how much money a user intends to make as the user's down payment. The preferred embodiment uses the ComboHierarchy data structure to specify parameter values that depend on user selections from more than one Hierarchy. In the example model, there is a ComboHierarchy called 'H_InterestRates' that is used to specify values for P_InterestRate.

The engine includes efficient data structures and algorithms for looking up parameter values from user selections as described below. To find a parameter value, the engine queries each Hierarchy and ComboHierarchy for values of that parameter. Only values which correspond to the user's selections are returned. For example, the Duration nodes that have not been selected by the user are not searched. Then, the engine looks for the most specific value of the parameter. Values that are specified closer to the leaves of a Hierarchy or ComboHierarchy are considered to be more specific than values specified closer to the root. This allows the modeler to define a default value for a parameter, and then to override the default value where appropriate.

Thus, the user of the application first inputs certain base data, such as desired down payment, desired monthly payment, etc. as indicated by stage 200 of the flow diagram of FIG. 2. By providing this information, the engine begins operating on the model for the purpose of return in information implicitly or directly requested by the user through the user interface to the application. Node Selection by Value is the first stage 210 in the flow diagram of FIG. 2. Each node can have an associated Range expression, which is a mathematical expression that describes what the node means. For example, the Down-payment node '0% to 5%' has the Range expression o<=value && value <5, where value is a variable that is bound to the user's input by the engine when the expression is evaluated. The Range expressions on a hierarchy are generally used by the application to convert user requests from floating point numbers (such as a down payment amount in francs or dollars for example) into node selections. To use the example model, the user does not have to choose the node '0% to 5%' explicitly. Instead, the user types in the amount of money that the user would like to spend on the down payment. The preferred embodiment then uses this value, along with the price of the vehicle, to determine which Down Payment node to select. The engine operates by iterating through each node in the Hierarchy, evaluating the Range expressions. Each node the expression of which evaluates to 'true' is returned as a match.

Next, the engine performs the configuration function as illustrated by stage 220 of the procedural flow diagram of FIG. 2. Configuration, which includes algorithm evaluation, is a critical part of the present invention. The function of the engine is to infer inclusions and exclusions from a set of input selections. When a node is 'included', the implication is that the node is selected and cannot be deselected by the user. It can only be deselected by deselecting the node that triggered the inclusion. Exclusions are analogous to inclusions; the node is not available to the user until the exclusion inference is removed by deselecting a part that triggered the exclusion.

In one embodiment, configuration rules are used to ensure that the user makes required choices, and to describe which choices, options, and plans are compatible. The example model includes several examples of configuration logic. For example, the Min/Max attributes on the Hierarchy and PlanHierarchy elements tell the engine how many choices are to be made from each group. If Min=1 and Max=1, then exactly one choice must be made. Some other models have If Min=0 and Max=1, which means that no more than one selection can be made, but no selection is required. Constraint elements specify explicit configuration rules. For example, a constraint is used to specify that 'Corporate Plan' includes 'Corporate Customer'. This rule ensures that the 'Corporate Plan' requires the selection of the 'Corporate Customer' node from the 'Customer Type' hierarchy. Because there are Min=1 and Max=1 declarations on the 'Customer Type' hierarchy, if the user selects 'Private Customer' then 'Corporate Customer' will be excluded by the engine, which will in turn exclude the 'CorporatePlan' because the Includes constraint must not be allowed to fire.

When the user seeks information that initiates some computation on the model, that computation is performed using Algorithm Descriptors and Algorithms. An Algorithm Descriptor is basically a function prototype that is defined in the model. An Algorithm Descriptor specifies a set of input and output parameters; one or more Algorithms can then implement the interface described by the Algorithm Descriptor. Introducing the distinction between Algorithms and Algorithm Descriptors enables the model to be polymorphic with respect to which plan the user has selected. The example model only includes one Algorithm for each descriptor, but if a new plan is added that requires a different implementation for an algorithm, that new implementation can be added to the model without disrupting client code at all.

Algorithms may be implemented to perform all types of calculations that might be useful to returning information to the user. Any combination of parameters can be specified as inputs and outputs; this enables the user to approach the problem of building their plan from any angle, i.e. to start anywhere. For example, a user can decide for how long the user wants to lease a vehicle and then determine what the user's payment will be for a specific vehicle. In the alternative, the user can decide how much the user wants to pay each month and the present invention can tell the user those vehicles the user can afford by returning a maximum purchase price that can be financed.

The user submits a request for algorithm evaluation by specifying the name of an Algorithm Descriptor. The engine looks up Algorithms in the same way that it looks up parameter values. It traverses the Plan hierarchies and selects the most specific Algorithm that implements the Algorithm Descriptor. The Algorithm Descriptor specifies which input parameters are required to evaluate the algorithm. The engine looks at the set of parameters that were supplied by the user, and the set that is required by the algorithm, and the engine assumes that any required parameters not supplied by the user will be found in the database. The engine then employs a Parameter Lookup module to find all the remaining parameters. If there are any required parameters that have not been supplied by the application and cannot be found in the database, an exception is raised. Once the algorithm and all parameters have been located, the engine executes each stage in the Algorithm, and returns the resulting set of computed values to the caller.

The ability to sort a set of nodes based on the results of an algorithm is a powerful feature for guided selling. The finance engine enables the finance modeler to write algorithms that will be used for the explicit purpose of guiding users towards the solution that best meets their needs. The sorting module of the engine works by executing an algorithm repeatedly for a set of requests. The requests are then sorted according to the value of a result parameter from the algorithm. If the sorting does not determine a unique ordering (i.e. if some calculations produced the same result), the requests can be sorted a second time with another algorithm. This step in the method of the present invention is illustrated by stage 230 of the procedural flow diagram of FIG. 2.

Sorting is particularly powerful when used in conjunction with a configurator. For example, the user may want to sort the nodes in the PlanHierarchy according to a formula that computes how close that Plan comes to the user's ideal monthly payment. Each Plan may have a different set of configuration rules and defaults associated with it, so each request may contain a very different set of node selections. By using a configurator to construct the requests, the results of the sorting can be made complete and accurate with respect to both the configuration logic and the finance algorithms.

The following scenarios illustrate the functions performed by the engine to demonstrate how a user may wish to employ the application and how the application responds to these various usage scenarios.

1. Computing the Interest Rate

The user has configured a new truck. From the user's configuration, the application the user is using computes the cost of the vehicle, which comes out to an even $25,000. The configuration model of the vehicle also includes some additional information that the finance engine needs, such as the class of the vehicle ('Truck', as opposed to 'Car'). The user has also told the application that the user lives in Texas, and that the user is 30 years old.

The user decides that the user can make a down payment of $1250, or 5% of the total purchase price, and that the user wants to pay for the car over a period of 5 years (60 months). The user would like to know the available "High Plan" interest rate. This corresponds to stage 200 of the flow diagram of FIG. 2.

The engine begins the configuration process depicted by stage 210 of FIG. 2. The engine first uses parameter lookup. The task presented to the engine is to find the right value of a parameter for the user's selections. Parameter values are stored in the hierarchical data structures (Hierarchy and ComboHierarchy) of the model. To find a parameter value, the engine searches down the hierarchies looking for values for the parameter. A parameter value defined near the root of the tree may be overridden by a value defined closer to the leaves (a more specific value). If values for the parameter are found in more than one hierarchy, the engine reports an error. Suppose that the Interest Rate parameter is dependent only on the Down Payment Amount. Then the Down Payment hierarchy might look something like this:

| Down Payment Hierarchy |
| --- |
| Root (InterestRate = 0.0795) |
| 0-5% |
| 5%-10% |
| 10%-15% |
| 15%-20% |
| more than 20% (InterestRate = 0.0695) |

If the user is making a 5% down payment, the engine will find the value InterestRate=0.0795. However, if the user makes a 25% down payment, the value 0.0695 will override the default value of 0.0795.

A more interesting example occurs when the Interest Rate is dependent on both the Down Payment Amount, and on which plan the user has selected. Parameter values that depend on more than one factor are best stored in a Combo Hierarchy as previously discussed.

| Plan/Down Payment Combo Hierarchy |
| --- |
| Root |
|   Hi Plan |
|     0-10% (InterestRate = 0.1295) |
|     10%-20% (InterestRate = 0.1095) |
|     more than 20% (InterestRate = 0.0995 |
|   Corporate Plan |
|     0-10% (InterestRate = 0.0995) |
|     10%-20% (InterestRate = 0.0795) |
|     more than 20% (InterestRate = 0.0695) |

In this case, a 5% down payment on the 'Hi Plan' implies InterestRate=0.1295. The user can affect the interest rate either by choosing Corporate Plan, or by making a larger down payment.

Suppose the user now wants to know how much it will cost per month to finance a new truck over a 60-month period. In response to this user request, the Engine performs the Node Selection by Value, Configuration and Algorithm Evaluation operations. First, the application has to pass on the user's selections to the invention. The values that are sent to the invention are:

VehicleValue=$25,000

DownpaymentAmount=$1,250 (or 5%)

CustomerType=Private Individual Duration=60 Months

In one embodiment, the finance model requires that the user must choose from among the Down Payment values {0%-5%, 5%-10%, 10%-15%, 15%-20%, 20%-50%}. But all the application knows is that the user wants to pay $1,250, or 5%, of the $25,000 total. So the first step in computing the payment is to convert the 5% number into a selection from the Down Payment hierarchy. This selection is required because the model specifies that exactly one Down Payment node must be selected; the Down Payment selection is used by the model when determining the Interest Rate (see the previous scenario). As previously discussed, the model allows an arithmetic expression to be associated with each node in a hierarchy, and the example model contains the following expressions for the Down Payment nodes as indicated in the Table 2 below:

TABLE 2

| Node | Expression |
|---|---|
| Less than 5% | 0 <= value < 0.05 |
| 5%-10% | 0.05 <= value < 0.10 |
| 10%-15% | 0.10 <= value < 0.15 |
| 15%-20% | 0.15 <= value < 0.20 |
| 20%-50% | 0.20 <= value < 0.50 |

The GetNodeForvalue function in the engine iterates through all the nodes in a hierarchy, evaluating the node Expression. If exactly one match is found, it is returned; if no matches are found, the function returns null; if multiple matches are found, an exceptions is raised. In this case, the node 5%-10% matches the user's input, and it is returned to the application. The application then selects that node in the configuration. From user's selections, plus the inferred Down Payment selection '5%-10%', the engine can make several inferences. First, the 'Corporate Plan' is not available to the user, because the user is not a Corporate customer. Two, the 'Lo Plan' is not available to the user, because her down payment is only 5% of the Amount Financed and Lo Plan requires at least at 10% down payment. Thus, the user employs the 'Hi Plan' because a choice of exactly one Plan is required.

The engine next finds the Algorithms. The sample model includes the Algorithm Descriptors outlined below in Table 3:

TABLE 3

| Name | Inputs | Outputs |
|---|---|---|
| AD_TotalAmountToFinance | VehicleValue, Downpayment | TotalAmountToFinance = VehicleValue − Downpayment |
| AD_PureFinanceMonthlyPayment | VehicleValue, Downpayment, InterestRate, Duration | Monthly Payment = (the result of a fairly complex formula) |
| AD_ClosestPayment | VehicleValue, Downpayment, InterestRate, Duration, InputPayment | Difference = abs (InputPayment − AD_PureFinanceMonthlyPayment ( )) |

By examining the model, the application can determine that AD_PureFinanceMonthlyPayment will be able to tell the user what the monthly payment will be. So it submits a request to the finance engine that it find and evaluate a Algorithm that implements AD_PureFinanceMonthlyPayment for the current set of user inputs.

Of the set of parameters that serve as the input to the function, the user typically supplies some and some are looked up in the model. The engine is easily able to determine input parameters required by the algorithm but have not been supplied by the user. It assumes that any missing parameters are defined in the model, and it uses the exact mechanism for computing the interest rate above to try and determine their values. In this case, the engine looks for the value of the InterestRate parameter from the model, and finds the value 0.1295.

Once the input parameters have all been determined, the engine proceeds to find the Algorithm that it should execute. This is accomplished by searching the Plan hierarchy for an Algorithm that implements the Algorithm Descriptor requested by the application; the procedure for doing so is exactly the same as the one used to find parameter values. In this case, there is only one implementation of AD_PureFinanceMonthlyPayment in the model, but if a new Plan was added to the model that required a different implementation of the Monthly Payment algorithm, that new implementation could be incorporated into the model without affecting the application at all.

The engine then proceeds to evaluate the Algorithm. The evaluation of an algorithm proceeds in a series of stages. A stage may either be a mathematical expression, or it may invoke another algorithm. As each stage is processed, the engine updates the values of the output parameters. Once the algorithm evaluation is complete, the results are returned to the application.

The user is happy to see that the monthly payment is less anticipated. That leads the user to wonder whether the user should elect for a shorter duration on the loan? It would be nice to pay the truck off a year or two early. To determine what is the payment amount for various plan durations, the user wants to ask the finance engine: given all my previous selections, plus a monthly payment of the previously determined amount, which loan duration makes the most sense for me?

The engine of the preferred embodiment can provide this information by sorting the Duration nodes according to the results of an Algorithm Descriptor. In particular, the model includes the AD_ClosestPayment, which computes the difference between the amount that the user wants to pay, and the amount that they actually will pay for a given set of inputs. The engine is able to Sort the nodes in a hierarchy by repeatedly executing an algorithm. Each time the algorithm is executed, a different node from the hierarchy is selected. The results of the algorithm then provide an ordering of the nodes.

The user may still not be quite satisfied with the finance plan. To keep the job of managing finances as easy as possible, the user wants the monthly payment to be exactly some predetermined amount. The user is willing to adjust the amount of the user's Down Payment to make the monthly payment amount come out just right. The user's question to the invention is now 'How much should my down payment be to get a monthly payment of the predetermined amount, over a period of some predetermined duration'? The operation of the engine is essentially the same as for computing the monthly payment. The only difference is which Algorithm Descriptor is used, and the fact that the inputs and outputs are slightly different.

Thus, with respect to FIG. 2, once the user has arrived at the right finance plan for the user, a maximum vehicle cost will be provided. This corresponds to the stage 232 of FIG. 2. A needs analysis module can be provided that can solicit additional information from the user concerning the various features of a vehicle most important to the user, as well as which options are most important to the user, to produce a series of vehicle configurations that are the best fit for those features as prioritized is by the user and constrained by the maximum vehicle cost. This is represented by the flow through stages 234, 236, 238 and 240. If the user selects a vehicle configuration, that configuration is saved (stage 242) and the application ends. If the user does not select a vehicle, the user has the option to go back through the application to select other vehicle configurations, to change the user's selection of the finance plan, or to start over completely and provide new external information to revisit the determination of the best financing plan and ultimately the maximum vehicle cost output.

It should be recognized that the procedural flow depicted in FIG. 2 is really but one flow that a user can take the system on. Because of the object-oriented nature of the invention, it should be clear that the finance terms can be examined and iterated from any angle. The purpose of the procedural flow example of FIG. 2 is merely to illustrate how the system reacts to one possible set of inputs provided by a user to produce a desired output. The method of the present invention is completely flexile. Indeed, even the vehicle configuration process could be invoked first, providing a wish list of vehicles and options leading to a vehicle purchase price that can be used to make monthly payment determinations and a selection of a best financing plan. The model itself makes no assumptions about what the user will want to do with the data, or where to start in the process.

Figure 3:
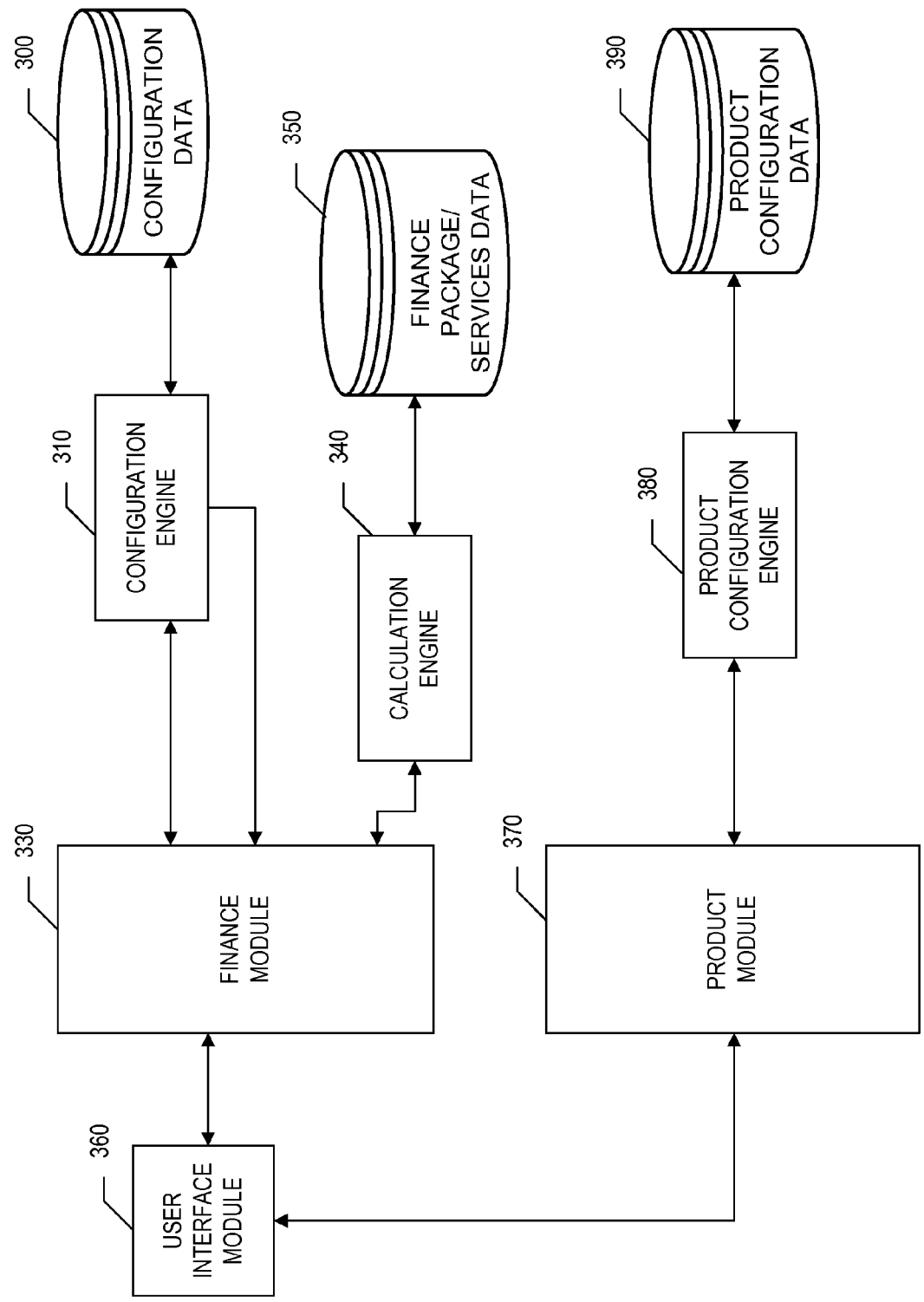
FIG. 3 illustrates a block diagram of one embodiment of a financing engine, configuration engine, and database architecture.

FIG. 3 illustrates the distinct separation from the product configuration process and the financial planning process of the invention. As previously discussed, User Interface Module 360 presents the Finance and Product applications to the user. Finance Module 330 and Product Module 370 provide a unified (application program interface) API. As previously discussed, the Configuration Engine 310 uses Configuration Data from memory storage 300 such as rules to evaluate plan availability, etc. Calculation Engine 340 accesses data and algorithms from memory 350 for calculating plan terms. Product Configuration Engine 380 accesses Product Configuration Data from memory storage 390 to perform needs analysis to determine the best or most desirable product configurations to be financed. Of course, as previously discussed Configuration Engine 310 and Calculation Engine 340 can be merged together, or implemented separately, as is the case for memory storage units 300 and 350. Although the finance and product applications are most likely best implemented separately, they too could be merged and together and maintained as one system.

Thus, it will be clear to those of skill in the art that the model of the present invention can be expanded to accommodate a myriad of finance plans, contextual information, constraints and algorithms, which makes the preferred embodiment of the invention highly valuable to dealers, financial institutions and car sales web sites on the Internet. Moreover, the financing portion of the invention is really independent of the product that is being purchased.

While the invention has been described with respect to the embodiments and variations set forth above, these embodiments and variations are examples and the invention is not to be considered limited in scope to these embodiments and variations. Accordingly, various other embodiments and modifications and improvements not described herein may be within the spirit and scope of the present invention, as defined by the following claims and their equivalents.

Appendix A attached hereto is a part of the present disclosure and is incorporated by reference herein in its entirety.

What is claimed is:

1. A computer system for automatically configuring financing plans, the system comprising:
  a processor; and
  a memory, coupled to the processor, having code stored therein and executable by the processor for:
    using configuration rules to infer inclusions and exclusions of the values of the one or more terms of the selected financing plan;
    selecting one of the plurality of financing plans determined to be available based on a priority specified by the set of configuration rules; and
    selecting one of the financing plans determined to be available based on an input selection conveyed by the base data.

2. The computer system of claim 1 wherein the code is further configured for:
  determining which of the plurality of financing plans are available for selection.

3. The computer system of claim 2 wherein the code is further configured for:
  converting at least a portion of the base data into input selection concerning the data defining the plurality of financing plans.

4. The computer system of claim 3 wherein the code is further configured for:
  inferring inclusions and exclusions concerning features of the plurality of financing plans based on the input selections and a set of configuration rules.

5. The computer system of claim 2 wherein the code is further configured for:
  sorting the available financing plans based on at least one predetermined criterion.

6. The computer system of claim 1 wherein the terms include services and features and the code is further configured for:
  configuring the selected financing plan by selecting a plurality of services and features to include in the selected financing plan, wherein at least one of the features is automatically included, in accordance with configuration rules, in the selected financing plan because of inclusion of another one of terms.

7. A non-transitory, computer program product comprising code stored therein and executable by a processor for:
  selecting one of a plurality of financing plans in accordance with the base data and data defining the plurality of financing plans;
  inferring inclusions and exclusions concerning features of the plurality of financing plans based on the input selections and a set of configuration rules;
  selecting one of the plurality of financing plans determined to be available based on a priority specified by the set of configuration rules; and
  selecting one of the financing plans determined to be available based on an input selection conveyed by the base data.

8. The nontransitory, computer program product of claim 7 wherein the code is further configured for:
  determining which of the plurality of financing plans are available for selection.

9. The nontransitory, computer program product claim 8 wherein the code is further configured for:
  converting at least a portion of the base data into input selection concerning the data defining the plurality of financing plans.

10. The nontransitory, computer program product of claim 8 wherein the code is further configured for:
sorting the available financing plans based on at least one predetermined criterion.

11. The nontransitory, computer program product of claim 7 wherein the code is further configured for:
using the configuration rules to infer inclusions and exclusions of the values of the one or more terms of the selected financing plan.

12. The nontransitory, computer program product of claim 7 wherein the terms include services and features and the code is further configured for:
configuring the selected financing plan by selecting a plurality of services and features to include in the selected financing plan, wherein at least one of the features is automatically included, in accordance with configuration rules, in the selected financing plan because of inclusion of another one of terms.

13. A method comprising:
performing by a processor of a computer system:
converting the base data into selection criteria for a plurality financing plans;
receiving a selection of one of the configured financing plans;
sorting the configured financing plans in accordance with predetermined criteria; and
including the sorted configured financing plans in the output data.

14. The method of claim 13 wherein the base data includes user selected configuration options for a product and the financing plans correspond to financing the product.

15. A computer system comprising:
a processor; and
a memory, coupled to the processor, having code stored therein and executable by the processor for:
receiving a selection of one of the configured financing plans;
sorting the configured financing plans in accordance with predetermined criteria; and
including the sorted configured financing plans in the output data.

16. The computer system of claim 15 wherein the base data includes user selected configuration options for a product and the financing plans correspond to financing the product.

17. A non-transitory, computer program product comprising code stored therein and executable by a processor for:
converting the base data into selection criteria for a plurality financing plans;
receiving a selection of one of the configured financing plans;
sorting the configured financing plans in accordance with predetermined criteria; and
including the sorted configured financing plans in the output data.

18. The nontransitory, computer program product of claim 17 wherein the base data includes user selected configuration options for a product and the financing plans correspond to financing the product.

* * * * *